Jan. 17, 1967 R. C. TRESEDER 3,299,418

REMOTE TERMINAL DISPLAY SYSTEM

Filed May 14, 1963

INVENTOR.
ROBERT C. TRESEDER
BY John L. Jackson
ATTORNEY

United States Patent Office 3,299,418

Patented Jan. 17, 1967

3,299,418

REMOTE TERMINAL DISPLAY SYSTEM

Robert C. Treseder, San Jose, Calif., assignor to International Business Machines Corporation, New York, N.Y., a corporation of New York Filed May 14, 1963, Ser. No. 280,196
3 Claims. (Cl. 340—324)

This invention relates to display systems in general and more particularly to a display system wherein a central computer or digital file is used to control a plurality of remote displays located at a plurality of locations.

In many applications there is a need for a number of displays, located at remote locations from a central computer or other control means, which are controlled by the central computer. Thus, for example, in banking applications tellers at different branch locations should ideally be able to use displays which are under control of a central computer. This is simply a matter of economics since, obviously, in most instances, the relative high cost would prevent the use of a computer located at each of the branch offices.

Several remote display systems which are controlled by a central computer have recently evolved. However, the high cost of these systems has prevented widespread use thereof. The prime reason that the cost of the prior art systems is prohibitive is that the line linking the central file or computer and each of the remote locations must be an expensive coaxial broad band line capable of handling television frequencies. Ordinary telephone lines will not suffice since their available band is at best from 200–3000 cycles. Thus, special coaxial cables must connect the central computer and the remote branch locations. Obviously, this is impossible in many instances due to the distances involved and in other instances, while being physically possible, is quite expensive.

There are basically two reasons why prior art display systems have required broad band links between the central file and the remote locations. First, normally the remote display is of the television type and is driven from a "Vidicon" (trademark, Radio Corporation of America), which, as is well known, must, in the normal TV type display, repeat the raster at the rate of approximately 30 times per second. Therefore, this system obviously requires a very broad band link. Secondly, if a subraster technique is used, for a letter to be communicated from a central location to a remote display, at least a 7 x 9 matrix is required. Thus, 63 separate pulses are required per character. This requisite number of pulses increases where more complicated characters such as Chinese or Japanese characters are to be transmitted.

An object of the invention is therefore to provide a novel display system wherein narrow bandwidth lines such as normal telephone lines can be used to connect a central computer or controller to a plurality of remote display terminals.

Another object of the present invention is to provide a display system wherein readily available off-the-shelf displays are utilized.

Another object of the present invention is to provide a display system wherein the same basic digital logic techniques are used to control multi-language displays.

Other and further objects and advantages of the invention will be apparent from the following more particular description of the preferred embodiment of the invention, as illustrated in the accompanying drawings in which.

Figures 1, 2, 3, 4:
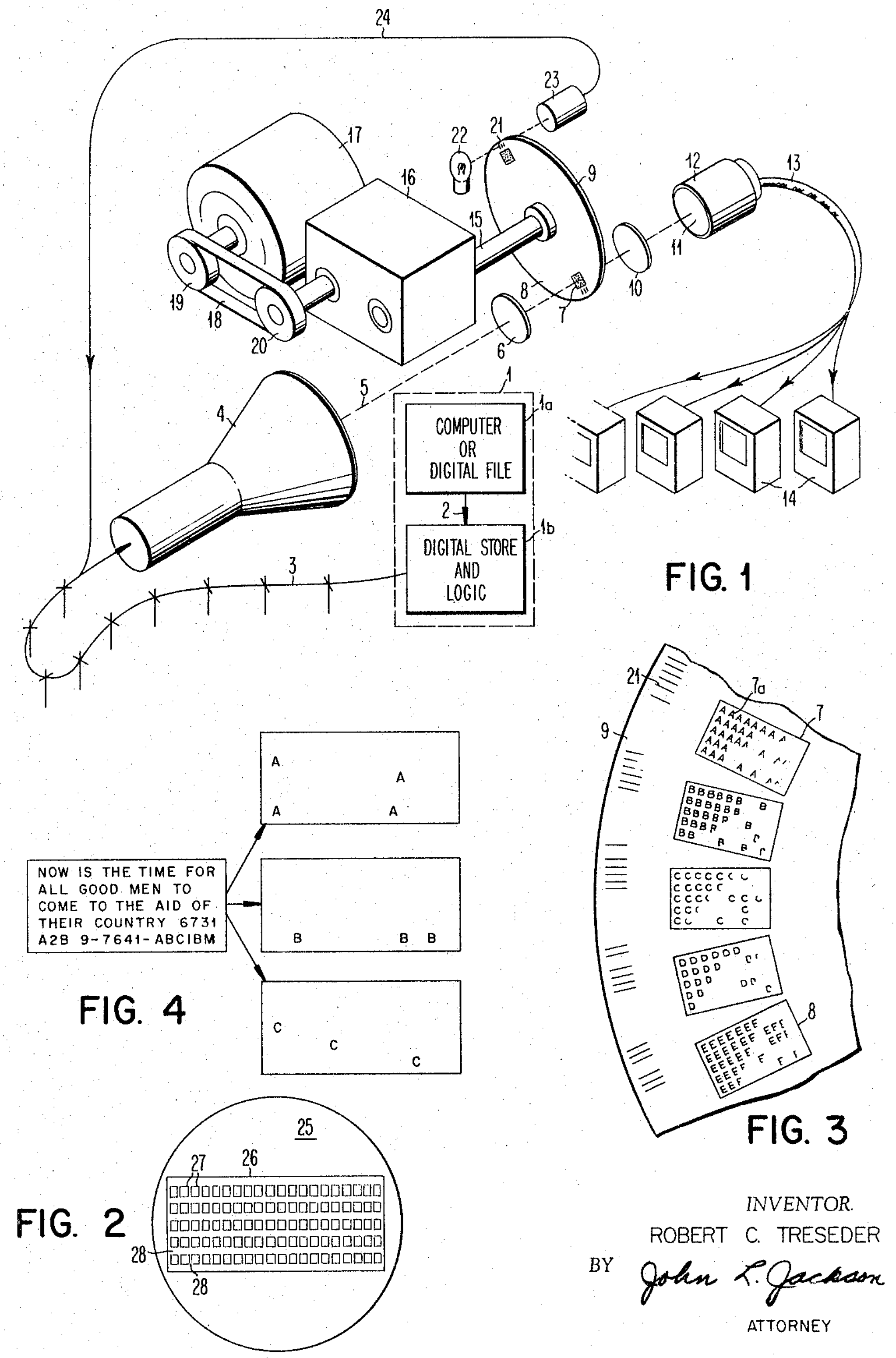
FIG. 1 is a schematic diagram of the display system.
FIG. 2 is a view of the face of the cathode ray tube which is used as a light strobe.
FIG. 3 is a partial section of the mask disk used in the system which is strobed by the cathode ray tube.
FIG. 4 is a view illustrative of the timewise printing on the memory tube used in the display system.

Briefly, in the hereinafter described novel system, a central control unit capable of controlling a plurality of remote display terminals is connected along a relatively narrow bandwidth line such as an ordinary telephone line to a plurality of remote display terminals. Information fed along the connecting link is, in the preferred embodiment of the invention, in the form of an $n$–100 code and is used to control the beam intensity of a cathode ray tube which is used to strobe an associated mask to selectively print on a "Permacon" (trademark, Westinghouse Corporation), or other similar type memory tube in optical alignment therewith. A plurality of displays such as television receivers is connected to each memory tube.

For a more detailed description, refer first to FIG. 1 wherein is shown in block diagram form a central control unit 1 including a computer or other type of digital file **1*a* connected along line 2 to a digital store and logic 1*b*. The digital store and logic 1*b* is connected along a normal narrow bandwidth telephone line 3 to a cathode ray tube 4. The beam 5 of the cathode ray tube is focused by means of lens 6 onto one of the plurality of masks 7 contained by the disk 9. The light from the cathode ray tube passing through the masks 7 is imaged by the lens 10 onto the face 11 of a memory tube 12. The memory tube 12 may be of the "Permacon" type, but, as will hereinafter become apparent, may be of any other similar type so long as it can retain information which is imaged onto its face for at least one second and preferably for several minutes. The output of the memory tube 12 is fed along a coaxial cable 13 to a plurality of television type displays 14**.

The disk 9 containing the masks 7 is supported by suitable means such as a shaft 15 which in turn is supported and driven by a system 16 which will provide a Geneva type movement such that as the masks 7 on the disk 9 move onto the optical axis 8, each is held stationary for a short period of time for strobing by the cathode ray tube spot. As represented in FIG. 1, a gear reduction and intermittent movement system 16 is driven by a synchronous motor 17 by means of conventional belt 18 and pulley 19 and 20 arrangement.

The disk 9 not only contains the information masks 7, but, additionally, contains associated with each mask a visible code 21 which is indicative and may be used to identify which of the masks 7 is on the optical axis 8. Light from a lamp 22 passes through the code 21 on the disk 9, is modulated thereby and received by a photocell 23. Output from the photocell, which is a series of pulses, is fed along line 24 back along the telephone line 3 to the central control unit 1.

The cathode ray tube 4, disk 9 and masks 7 arrangements and memory tube 12 constitute the display driver for the displays 14.

Refer next to FIG. 2 wherein is shown a frontal view of the face of the cathode ray tube 4. The face 25 of the cathode ray tube is blanked out except for a rectangular portion 26 which, as will hereinafter become obvious, corresponds to the format of the messages which can be transmitted by the subject display system. The rectangular area 26 on the face 25 is divided up into 100 discrete areas 27 through which the spot light of the cathode ray tube may pass. The areas 27 are arranged in a 5 x 20 matrix. The particular arrangement of the matrix on the face of the cathode ray tube 4 is not important. It must, however, as will become obvious, correspond to the configuration of the masks 7 contained by the disk 9. Each of the areas 27 appearing in the rectangular area 26 is separated by opaque strips 28 which, when the spot of the cathode ray tube falls in the center of one of the areas 27, functions to effectively limit the light output from the cathode ray tube at that instant to the particular area illuminated at that instant by the spot. Thus, the spot of the cathode ray tube may be caused to selectively illuminate any of the discrete areas 27.

Alternate methods of illuminating the areas 27 would be through use of a small spot moved in a subraster or by removal of phosphor from the face of the cathode ray tube in those areas corresponding to the opaque strips 28.

Refer next to FIG. 3 wherein is shown a blownup section of the disk 9. As shown in FIG. 3, the disk 9 contains a plurality of the masks 7 arranged such that rotation of the disk 9 will cause the masks 7 to appear sequentially on the optical axis 8. The information appearing on each of the masks 7 is arranged in a format identical to that of the rectangular area 20 appearing on the face 25 of the cathode ray tube 4 as heretofore described such that 100 printing positions are provided. Further, the print characters **7*a*** appearing at each printing position on each of the individual masks is identical. Thus, one mask will contain all A's while the next will contain all B's, while the next will contain all C's, etc.

The print characters **7*a*** on the masks may, of course, be either transparent or opaque with respect to the remainder of the mask.

As heretofore mentioned, each of the masks 7 contained on the disk 9 a code 21 associated therewith which is indicative and may be used to identify which of the masks 7 is at that instant on the optical axis 8. This information, as previously stated, is fed back from the photocell 23 to the central control unit 1.

In operation, the synchronous motor 17 and intermittent motion member 16 causes the disk 9 to rotate in Geneva-like fashion to sequentially position the masks 7 on the optical axis 8 of the lenses 6 and 10. The photocell 23 reads the optical code 21 appearing on the disk 9 and furnishes a signal along lines 24 and 3 back to the central control unit to identify which of the masks 7 is at that instant on the optical axis 8. This signal from the photocell 23 is then used in conventional fashion to gate out the contents of the digital store **1*b*. Assuming that the mask containing A's falls on the optical axis 8, this information will be fed to the digital store 1*b* which generates a pulse to control the spot of the cathode ray tube 4, such that each time an A is to be printed in the message which is to be displayed, it is brightened. Thus, if the message shown in FIG. 4 is to be displayed, the A's will be printed on the face 11 of the memory tube 12 at time T1, then all of the B's will be printed at time T2, all of the C's will be printed at time T3, etc. By the time the disk 9 makes a complete revolution, the complete message will have been printed on the face 11 of the memory tube 12, which, as previously described, has the ability to retain the message printed on its face. This message printed on the face 11 of the memory tube 12 is then used to control the television type displays 14 in a conventional manner along the coaxial cable 13**.

The speed of rotation of the disk is not critical; however, it has been found that if sixty masks are contained by the disk, it can be stepped to position each of the masks for strobing at the rate of one revolution per second. Thus, as heretofore stated, the memory tube 12 must retain an image on its face for at least one second. If the memory tube retains an image for only one second, however, the message must normally be regenerated a number of times to enable a human viewer to utilize the contents thereof. This would involve either tying up the central computer or utilizing a video buffer. Preferably then, the memory tube should be capable of retaining an image for several minutes, in which case the central computer is tied up only for one second per message and no video buffer is required.

Not only must an indication be furnished to the central control unit 1 as to which of the masks 7 is on the optical axis 8, but additionally, as is obvious, the sweep of the cathode ray tube beam must be synchronized with or made known to the digital storage **1*b*** such that the beam may be controlled timewise.

Additionally, while there has been described a system wherein one computer or digital file controls a single cathode ray tube printer at a remote location, it is obvious, of course, that at any remote location there may be any number of cathode ray tube type printers controlled by a remote computer or digital file.

Furthermore, while no inquiry terminals were shown associated with each of the television displays 14, it will be obvious that in the usual application, it would be advantageous to provide some means for allowing the operator or viewer to communicate with the central control unit 1.

In the above described manner I have provided a novel display system wherein narrow bandwidth lines can be used to connect a central computer or controller to a plurality of remote display systems. An inexpensive system is herein provided not only since telephone links can be utilized, but, additionally, since the components at each remote station are basic off-the-shelf items, i.e., cathode ray tubes and television receivers. Moreover, due to the utilization of the cathode ray tube strobe-disk arrangement, the disks may be changed to provide various type fonts and multi-language displays without a change in the basic system logic.

While the invention has been particularly shown and described with reference to a preferred embodiment thereof, it will be understood by those skilled in the art that various changes in the form and details may be made therein without departing from the spirit and scope of the invention.

What is claimed is:

1. A display system wherein a central control unit controls the information displayed at a plurality of remote display terminals linked thereto by means of a narrow bandwidth line, each of said remote display terminals comprising:
   - mask means including a plurality of masks each containing a plurality of identical print characters,
   - at least one cathode ray tube for strobing selected print characters on each mask connected by means of said narrow bandwidth line to said central control unit,
   - drive means positioning each of said masks in a strobing relationship with said cathode ray tubes,
   - synchronization means connected to said central control unit identifying which of said masks are in strobing relationship with said cathode ray tubes at any given time,
   - a memory tube in optical association with each of said cathode ray tubes and said masks, and
   - at least one display means connected to each of said memory tubes.

2. A display system wherein a centrol control unit controls the information displayed at a plurality of remote display terminals linked thereto by means of a narrow bandwidth line, each of said remote display terminals comprising:
   - mask means including a plurality of masks each containing a plurality of identical print characters,
   - at least one cathode ray tube for strobing selected print characters of each mask connected by means of said narrow bandwidth line to said central control unit,
   - drive means positioning each of said masks in strobing relationship with said cathode ray tubes,
   - synchronization means connected to said central control unit identifying which of said masks are in strobing relationship with said cathode ray tubes at any given time, means for preventing the light from said cathode ray tube from illuminating more than one print character on said masks at a time, a memory tube in optical association with each of said cathode ray tubes and said masks, and at least one display means connected to each of said memory tubes.

3. A display system wherein a central control unit controls the information displayed at a plurality of remote display terminals linked thereto by means of a narrow bandwidth line, each of said remote display terminals comprising:

a plurality of masks each containing a plurality of identical print characters, a cathode ray tube for strobing selected print characters on each mask connected by means of said central control unit, means for preventing the light from said cathode ray tube from illuminating more than one print character on said masks at a time, means for intermittently positioning one of said plurality of masks in optical association with said cathode ray tube so that said cathode ray tube has sufficient time to strobe selected print characters, means connected to said central control unit for identifying which of said masks are in strobing relationship with said cathode ray tube at any given time, a memory tube in optical association with each of said cathode ray tube and said masks, and at least one display means connected to each of said memory tubes.

References Cited by the Examiner

UNITED STATES PATENTS

| | | | |
|---|---|---|---|
| 2,533,242 | 12/1950 | Gridley | 340—324.1 |
| 2,714,841 | 8/1955 | Demer et al. | |
| 2,905,897 | 9/1959 | Giel | 324—98 |
| 3,017,625 | 1/1962 | Evans et al. | 340—324 |
| 3,020,531 | 2/1962 | Appleton | 340—324 |

FOREIGN PATENTS

| | | |
|---|---|---|
| 786,043 | 11/1957 | Great Britain. |
| 881,465 | 11/1961 | Great Britain. |

NEIL C. READ, *Primary Examiner.*

A. J. KASPER, *Assistant Examiner.*